July 20, 1971  C. PANATTONI  3,594,189

PARTIALLY BONED POULTRY PRODUCT AND METHOD OF PREPARING SAME

Filed Nov. 13, 1967  5 Sheets-Sheet 1

INVENTOR.
CARLO PANATTONI
BY Julian Caplan
ATTORNEY

INVENTOR.
CARLO PANATTONI
BY
ATTORNEY

July 20, 1971 C. PANATTONI 3,594,189
PARTIALLY BONED POULTRY PRODUCT AND METHOD OF PREPARING SAME
Filed Nov. 13, 1967 5 Sheets-Sheet 4

INVENTOR.
CARLO PANATTONI
BY
Julian Caplan
ATTORNEY

INVENTOR.
CARLO PANATTONI
BY Julian Caplan
ATTORNEY

United States Patent Office 3,594,189
Patented July 20, 1971

3,594,189
PARTIALLY BONED POULTRY PRODUCT AND METHOD OF PREPARING SAME
Carlo Panattoni, San Francisco, Calif., assignor to San Francisco Poultry, Inc., doing business as American Poultry Company, San Francisco, Calif.
Filed Nov. 13, 1967, Ser. No. 682,300
Int. Cl. A22c 21/00
U.S. Cl. 99—107                                    5 Claims

ABSTRACT OF THE DISCLOSURE

A single portion of partially boned poultry product is formed by filleting a double chicken breast to which the first joints of the wings remain attached and wrapping the meat around a ball of dressing. The product simulates a miniature whole roast chicken, the wing stubs simulating the drumsticks and the breast meat the chicken carcass.

---

This invention relates to a new and improved method of preparing a chicken product and to the product produced. More particularly, a single portion of chicken white meat and dressing of a pleasing and novel appearance is produced. The product is particularly suitable for catered meals, such as airline meals and banquets. The value of the product is greatly upgraded by the appearance of the product produced.

A further object of the invention is to prepare a single portion chicken meat dish from which nonedible weight, with the exception of the first joint of the wing bone, has been removed. Transportation, cooking and serving of the product is greatly facilitated. The need for the customer to carve or otherwise prepare the poultry before cooking and serving is eliminated. Thus the invention reduces the time and labor required of the customer in preparing the product for the table.

One of the important features of the invention is the provision of an all-white meat product which in its completed shape resembles a miniature whole chicken. Thus, a highly valuable product is produced from a portion of the chicken carcass and yet the remainder of the carcass may be sold as poultry parts or otherwise processed. White meat portions of chicken command a premium price because of consumer preference and the present invention, although resembling a miniature whole chicken, is made entirely of white meat and thus from a price standpoint takes advantage of consumer preference.

Another feature of the invention is the method of preparing the product which enlarges the visual appearance of the portion without enhancing the weight of white meat employed.

A still further feature of the invention is that the product may be prepared by skilled workers rapidly, and accordingly the labor cost is low as compared with the premium price which the product commands.

Other objects of the present invention will become apparent upon reading the following specification and referring to the accompanying drawings in which similar characters of reference represent corresponding parts in each of the several views.

The chicken from which the product is made is preferably a frying chicken having a dressed weight of between 2¼ and 3¼ pounds, of the type sold as whole poultry. The carcass has been cleaned and eviscerated and the neck removed.

The first step in the preparation of the product is to saw the humerus adjacent the first wing joint leaving the surrounding meat substantially intact. However, in subsequent handling, the meat tends to withdraw so that the outer end of the severed humerus is bared.

The next step is to remove each thigh and leg intact from the carcass as well understood in the preparation of poultry parts. There then remains on the carcass a point 21 of skin which extends down the breast to adjacent the sternum.

Figure 1:
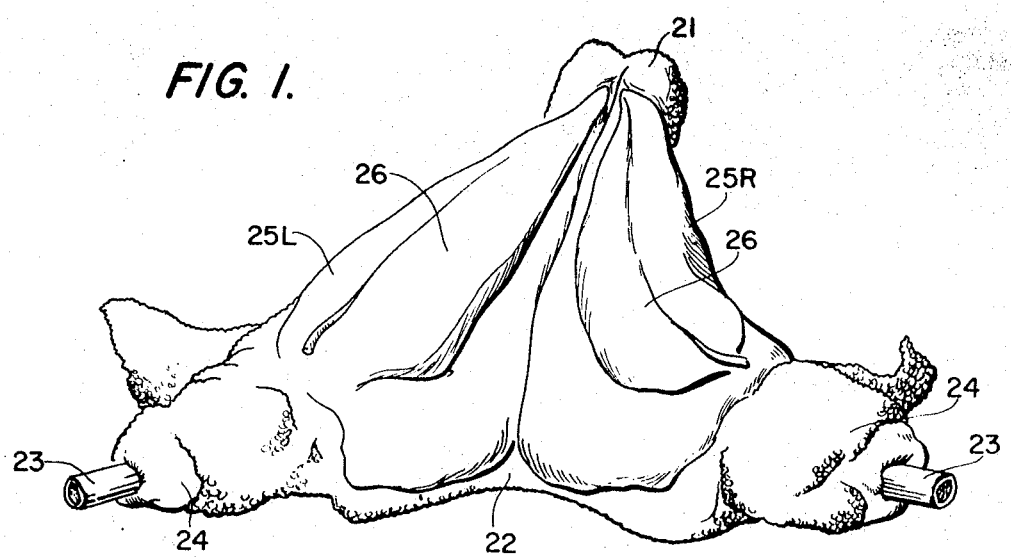
FIG. 1 is a perspective view of a chicken double breast in position for commencement of the preparation of the product.

The next step is to bone the double breast as a unit from the ribs and back of the carcass. In commercial preparation of poultry breasts, the double breast is sometimes severed at the middle to produce two pieces of breast meat, but in the practice of the present invention the severing of the two halves is not performed. When the double breast is removed from the carcass, the humerus bone is separated from its socket in the backbone of the carcass so that the humerus on each side of the bird remains with the breast meat. The double breast is deposited skin side down on a cutting board and assumes the shape illustrated in FIG. 1. The neck opening 22 is forward. The humerus bones 23 project forwardly and outwardly. The meat 24 surrounding the humerus bones is intact with the breast meat.

On each half of the breast, disposed centrally of each said half, extending longitudinally, is a lesser pectoral portion 26 commonly known as the fillet. Such fillet may be removed by plucking the same manually as is shown in the right hand side of FIG. 2. In the left hand side of FIG. 2 the fillet has already been removed and the left fillet 26L is deposited on the cutting board as shown in the lower left hand corner of FIG. 2.

Figure 2:
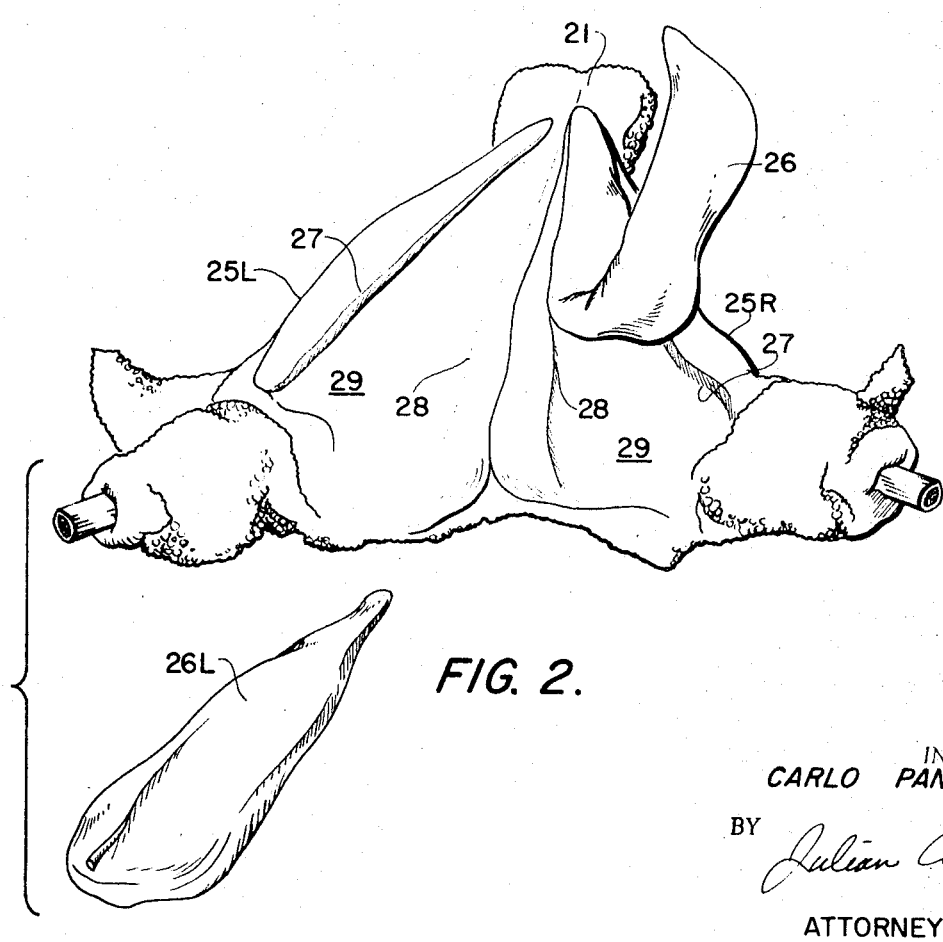
FIG. 2 is a view similar to FIG. 1 showing the fillet of the left hand side stripped away and the fillet of the right hand side in the process of being stripped away.

After the fillets have been removed from each side, as is shown from an examination of FIG. 2, there is a ridge 27 of pectoral muscle parallel to each margin but spaced inwardly thereof. There is also a ridge 28 between the depression 29 from which the fillet 26 has been removed and the center of the double breast. As shown in the right hand side of FIG. 3, a boning knife, with the blade held approximately parallel to the cutting board and the point directed outwardly, is drawn along the base of the ridge 27. The portion 29 which is freed from the underlying meat is not completely severed but is folded outwardly parallel to the cutting board as shown in FIG. 4, the crease where the outward fold has been made being indicated by reference numeral 31. Thus, the over-all width of the breast as viewed in FIG. 4 is considerably greater than that as viewed in FIG. 1 at the commencement of the filleting operation.

The next step of the preparation is shown in FIG. 4. The cutting knife is held roughly parallel to the cutting board with the point directed centrally-inwardly. A longitudinal cut is made rearwardly along the base of the ridge 28 and the portion 32 severed from the underlying breast meat is folded upwardly at about a 90 degree angle to the cutting board.

Figure 3:
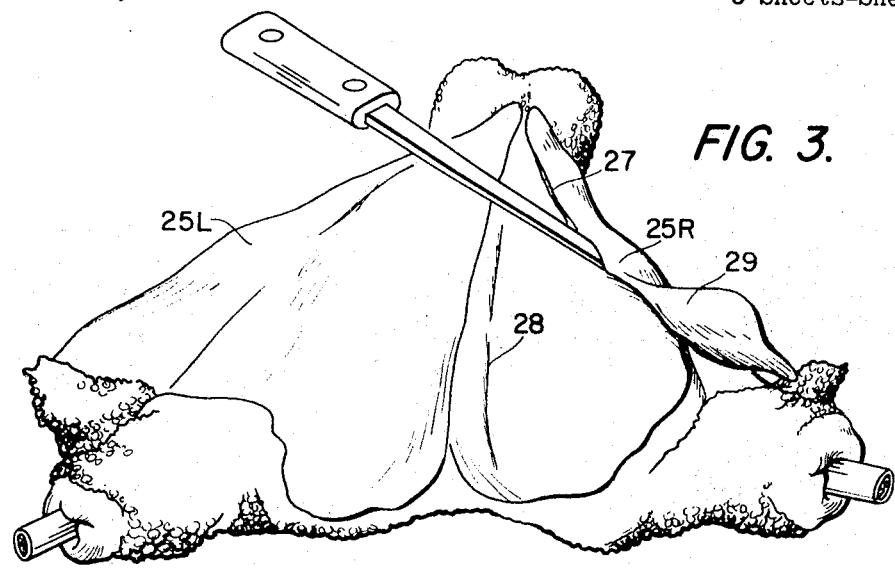
FIG. 3 is a view similar to FIG. 1 showing cutting into the marginal pectoral muscles.
Figure 4:
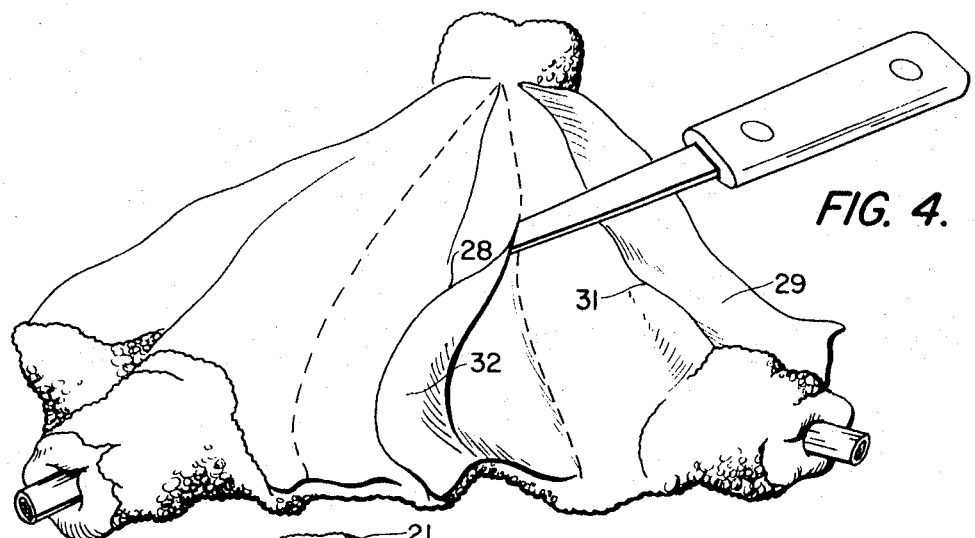
FIG. 4 is a view similar to FG. 3 showing the marginal pectoral muscle folded back and showing cutting into the central pectoral muscle on the right hand side.

The operations of FIGS. 3 and 4 are performed on both sides of the breast. Optionally, the fillets 26 and in fact the entire breast may be tenderized by use of a common butcher's tenderizing mallet or other means to break down the muscle structure.

Figure 5:
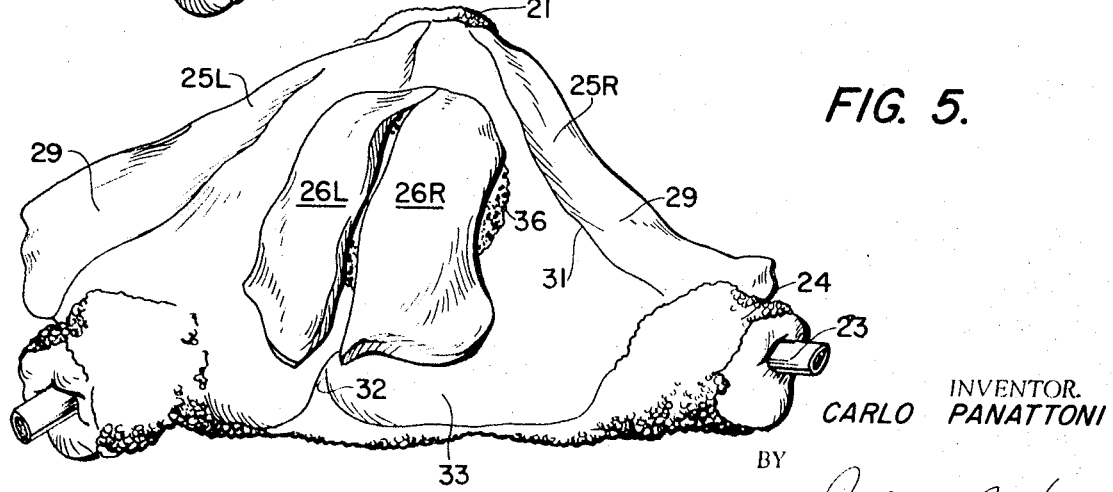
FIG. 5 is a view similar to FIG. 4 showing completing of the cutting of the pectoral muscles, deposit of a scoop of dressing and overlaying of the fillets.

The next step in the preparation is shown in FIG. 5. It will be seen that the layers 29 and 32 have been folded as previously indicated. A round scoop of dressing 36 is deposited in the center of the double breast. The fillet portions 26L and 26R are draped over the ball 36. Various dressings may be used. However, a wild rice and brown rice dressing has been found to be particularly suitable, the dressing being prepared from cooked wild rice and brown rice with chicken stock, mushrooms and white wine. Chicken livers, onions, ham, bacon, chicken fat, egg yolks, salt and other flavorings and spices may be added to taste.

Figure 6:
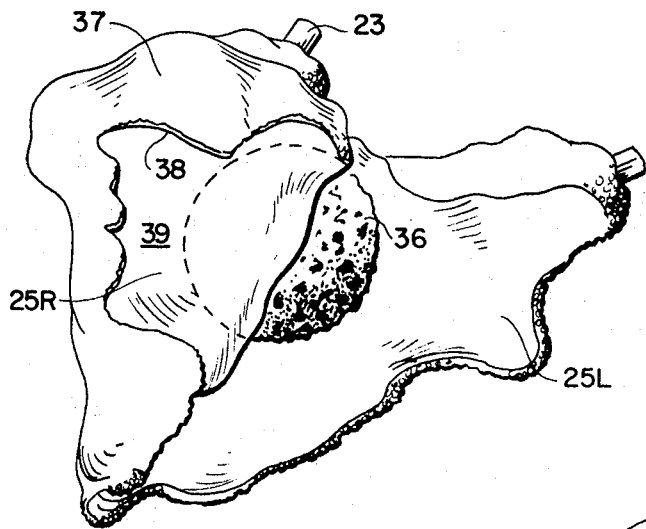
FIG. 6 shows the first step in the folding of the meat over the dressing.

FIG. 6 shows the product viewed in a direction opposite that of FIG. 5 in order to emphasize certain features of the next steps in the preparation of the product. The breast portion which has previously been designated 25R is rolled and folded over the ball 36 and draped fillets 26L and 26R. The skin 37 (which was concealed on the underside of the previous figures of the drawings) extends up toward the top although there is a bared portion 38 where there is no skin. It will be noted that the bone 23, corresponding to the right-hand half of the breast is centrally disposed and pointed forwardly as shown in the left side of FIG. 6.

Figure 7:
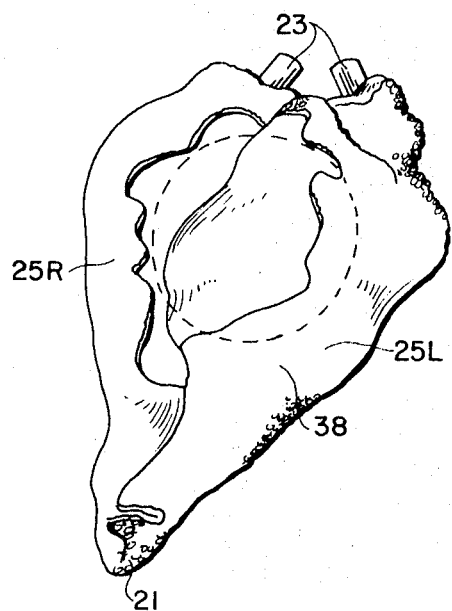
FIG. 7 shows the second step of such folding with the marginal edges overlapped.
Figure 8:
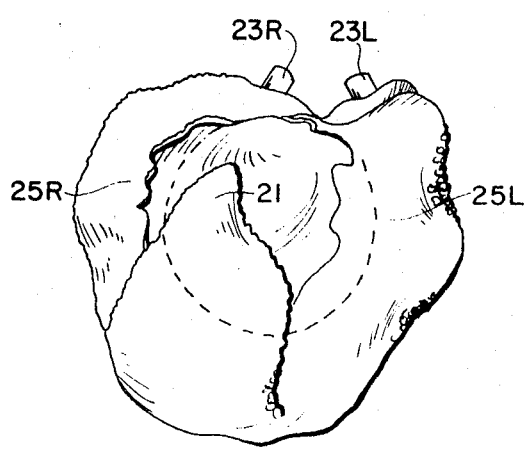
FIG. 8 shows the lower point folded back over the overlapped marginal edges.

As shown in FIG. 7, after the right-hand breast 25R has been folded as shown in FIG. 6, the left-hand side 25L is folded to overlap the right-hand side 24R. The two wing bones 23 are in close proximity but are spaced apart a definite distance at the front. As shown in FIG. 8, the tip 21 is then folded upwardly and forwardly to overlap the breast portions 25L and the underlying breast portion 25R. Essentially, the shape of the product at this intermediate stage of its production is convex, and essentially it conforms to the shape of the scoop 36 which is now totally covered by skin. The purpose of the filleting operation is also shown in FIG. 8 in that the dressing is completely enclosed by chicken meat and no part of the dressing is exposed.

Figure 9:
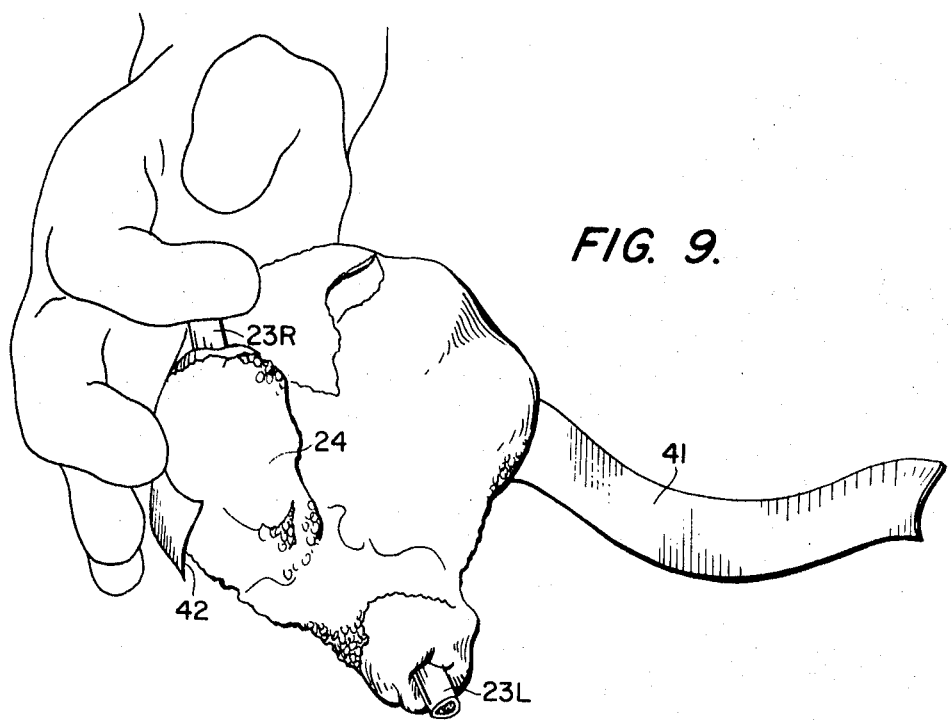
FIG. 9 shows inversion of the product from that occupied in FIG. 8 and commencement of the wrapping of the product with an oiled paper strip.
Figure 10:
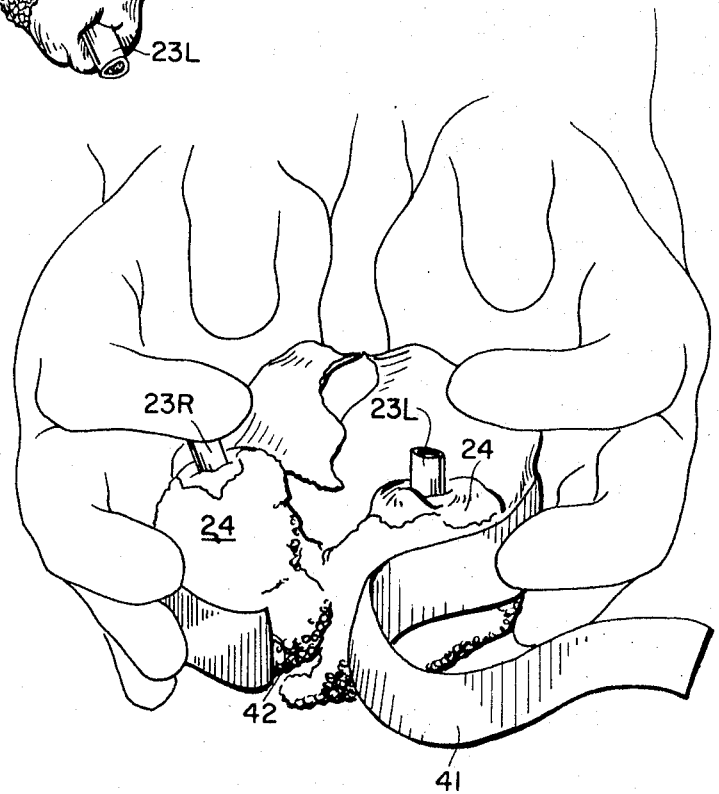
FIG. 10 is a view similar to FIG. 9 showing further progress of the wrapping step.

The product is then inverted—what is shown uppermost in FIG. 8 is bottommost in FIG. 9. In the operation illustrated in FIGS. 9 and 10, a long strip of oiled paper 41 about 1 inch in width is employed. One end 42 of the paper 41 is held in place by the fingers in a position adjacent one of the wing meat portions 24. The workman bends the adjacent humerus 23L up with the index finger and brings the strip of paper 41 around the back as viewed in FIG. 9 to the front. The other humerus 23R is bent up as shown in FIG. 10 and at least two circular wraps of paper 41 are wound around the product. The diameter of the ring of paper 41 is approximately 3 inches. The bottom 46 of the product tends to be flat and the top 47 convex. The stubs of the humerus 23 and the surrounding meat 24 resemble drumsticks. The entire visual impression of the completed product is that of a miniature roast chicken. The top 47 resembles the breast of a roast chicken and the wing meat 24, the drumstick. In the sectional view of FIG. 13 it will be seen that in the center of the product is a scoop 36 of dressing 36 which rests upon the meat 33 (FIG. 5) which is at the back of the chicken prior to the processing steps which have been described. On top of the scoop 36 are the fillet strips 26. Folded over the strips 26 are first the left breast side 25L and then the right breast side 25R.

Figure 11:
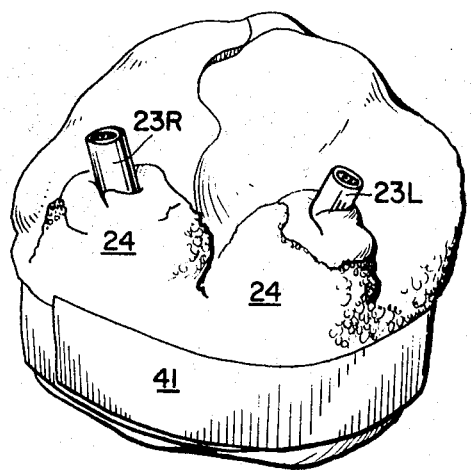
FIG. 11 shows completion of the wrapping step, the product being viewed from the top.
Figure 12:
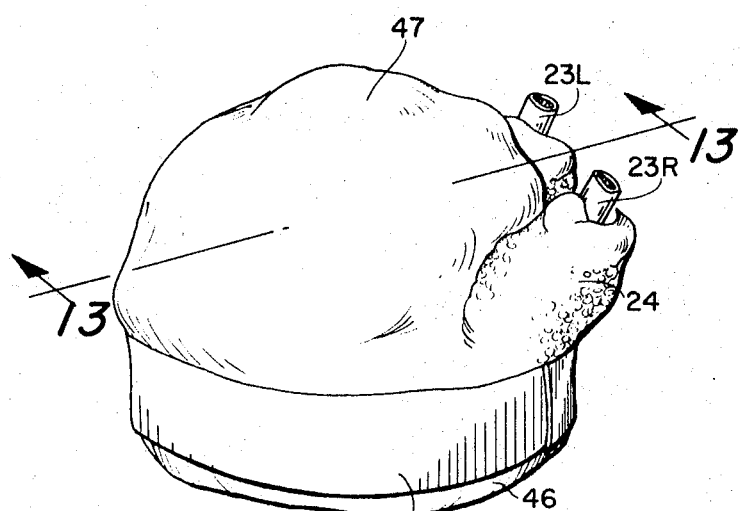
FIG. 12 is a view similar to FIG. 11 showing the product viewed from one side.
Figure 13:
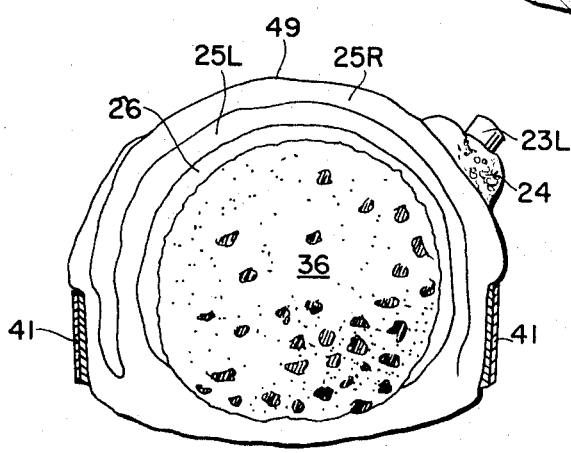
FIG. 13 is a vertical sectional view taken substantially along the line 13—13 of FIG. 11.

The final product shown in FIGS. 11–13 is frozen and stored.

To prepare the product for the table, the frozen chicken which may be termed "partially boned Cornish Game Hen (white meat only)" is roasted in an oven. After about 15 minutes roasting time, the strip 41 is removed since by this time the product has set in shape. Thereafter, the roasting is continued until the meat is the desired degree of tenderness, the rice dressing likewise cooking to completion. The product is served as an individual portion.

I claim:

1. A method of preparing a poultry product comprising the steps of: severing the poultry wings adjacent the outer ends of the humerus, boning the double breast of the poultry from the poultry carcass while disengaging the inner ends of each humerus from the skeleton of the carcass so that the humerus and meat surrounding the humerus remains with the breast meat, filleting the double breast by plucking from each side of the breast the central longitudinal lesser pectoral muscle commonly known as the fillet, slitting into the pectoral muscle outwardly of the prior location of said fillet, bending the last-mentioned slit material laterally outward to augment the width of the meat of the breast, slitting the pectoral muscle inwardly of the prior location of said fillet toward the longitudinal center of the double breast, and folding the last-mentioned slit material upward, depositing a scoop of dressing adjacent to the center of the inside of said double breast, draping the fillets of each side of the breast over said dressing before wrapping said first side, wrapping a first side of said double breast from the lateral margin thereof over said dressing, wrapping the second side of said double breast from the lateral margin thereof overlapping said first side, folding the back edge of said double breast partially over said overlapped second and first sides, inverting the double breast, and conforming the shape of said double breast by first bending said humerus bones upward and then securing said double breast in a circumferentially confined condition with said humerus bones bent upwardly and inwardly relative to said product.

2. A method according to claim 1 which further comprises subsequently freezing said product.

3. A method according to claim 1 in which said securing step comprises wrapping a narrow strip of paper on edge in a ring of restricted diameter around said product, portions of the humerus and surrounding wing meat on each side confined within said ring.

4. A method according to claim 1 which further comprises the step of tenderizing the meat of the double breast and both fillets before depositing said dressing.

5. The product of the method of claim 1.

References Cited

UNITED STATES PATENTS

| | | | |
|---|---|---|---|
| 2,844,844 | 7/1958 | Sieczkiewicz | 99—107X |
| 2,853,389 | 9/1958 | Luchese | 99—107 |
| 3,006,766 | 10/1961 | Zolezzi et al. | 99—107 |
| 3,031,310 | 4/1962 | Zolezzi et al. | 99—107 |

JOSEPH M. GOLIAN, Primary Examiner

U.S. Cl. X.R.

17—11; 99—194